United States Patent

Lavender

[15] 3,674,862

[45] July 4, 1972

[54] LIVE ATTENUATED RABIES VIRUS VACCINE AND PROCESS THEREFOR

[72] Inventor: John F. Lavender, Indianapolis, Ind.

[73] Assignee: Eli Lilly and Company, Indianapolis, Ind.

[22] Filed: April 2, 1970

[21] Appl. No.: 25,243

[52] U.S. Cl. ....................................................424/89
[51] Int. Cl. .........................................................C12k 5/00
[58] Field of Search ..........................................195/1.1–1.5; 424/89

[56] References Cited

UNITED STATES PATENTS

| | | | |
|---|---|---|---|
| 3,255,080 | 6/1966 | Emery | 424/89 |
| 2,768,114 | 10/1956 | Koprowski et al. | 424/89 |
| 3,143,470 | 8/1964 | Wilner | 195/1.1 |

*Primary Examiner*—Richard L. Huff
*Attorney*—Everet F. Smith and John T. Reynolds

[57] ABSTRACT

Live, attenuated rabies virus vaccine is produced from trypsinized rabies virus infected duck embryo cells grown in cell culture monolayer. The infectivity for duck embryos of the rabies seed virus is enhanced by growing the CVS–11 fixed rabies virus alternately in mouse brain (or suckling rat brain — SRB) and duck embryo tissue cultures for five alternate passages, and then continuing the growth of the virus in duck embryo tissue cultures for six or seven passages.

5 Claims, No Drawings

LIVE ATTENUATED RABIES VIRUS VACCINE AND PROCESS THEREFOR

INTRODUCTION

This invention relates to an improved live, attenuated rabies virus vaccine and to methods for preparing the product. More particularly, this invention provides an improvement to current processes for preparing live, attenuated rabies vaccines which result from the growth of the virus in duck embryo tissue cultures, so that the resulting vaccine will give good seroconversion and protection of vaccinated dogs and cats.

BACKGROUND OF THE INVENTION

Rabies is an ancient disease and reports of its occurrence in Europe and Asia date back at least 2,000 years. Although the disease has been primarily associated with dogs practically all warm blooded animal species are susceptible to the infection. The disease in animals was described by Aristotle in 322 B.C. Celsus, in 100 A.D. recognized the relationship of dog bites to rabies in human subjects. He recommended cautery of the wound, which became the treatment of choice for many centuries. In the 19th Century, Roux developed the intracerebral innoculation technique for infection of experimental animals and paved the way for Pasteur's historic work in 1884, which included the development of a fixed virus strain which then led to development of an attenuated vaccine produced from desiccated rabbit spinal cord. This was followed by the development of a phenol inactivated brain tissue vaccine by Semple.

The next major advance was the avian variety of fixed virus developed by passage of the Flury strain of rabies in one day old chick brain. Another fixed variant of the Flury strain was produced by Koprowski and Cox by passage of the virus in the yolk sac of chick embryos.

The chick embryo origin (CEO) vaccines have had wide acceptance in the veterinary field, especially because of their virtual freedom from the encephalitogenic factor. However, they still have the disadvantages of high extraneous protein content, occasional local and systemic reactions as well as anaphylactic shock.

U.S. Pat. Nos. 3,156,620, issued Nov. 10, 1964, and 3,255,080, are examples of recent improvements made in the production of live rabies virus vaccines from CEO tissue cultures. Both of these patents disclose that the rabies virus is innoculated directly into the chicken embryo tissue cultures.

SUMMARY OF THE INVENTION

According to this invention, 7-day-old duck embryos are innoculated with a mouse brain or suckling rat brain (SRB) and duck embryo cell culture adapted fixed rabies virus, the embryos are incubated for a suitable time period, the rabies infected embryos are trypsinized, and the resulting rabies infected cells are used as seed for the production of rabies virus in duck embryo monolayer tissue cultures, into which cultures the virus is released. The rabies virus is then recovered from the tissue culture growth medium without disturbing the growing cells. By this method the presence and need to remove undesired cell protein is minimized if not completely eliminated. This live, attenuated virus vaccine produces good $LD_{50}$, (as measured by intracebral innoculation of adult mice) sero-conversion, and effectively protects dogs against challenge with street virus. The vaccine has been shown to be safe in dogs even at 10 times the recommended vaccine dose.

DETAILED DESCRIPTION OF THE INVENTION

According to this invention a live, attenuated rabies virus vaccine can be prepared by a process which comprises (1) infecting fertile duck eggs with a mouse brain modified fixed rabies virus, (2) incubating the duck eggs for a period of time, (3) separating the rabies-infected duck embryos from their shells and undesired parts, e.g., the eyes and beaks, (4) trypsinizing the infected duck embryos to yield rabies containing cells, (5) adding a portion of the trypsinizing rabies virus-containing cells to a duck embryo cell growth medium, (6) growing the rabies virus infected cells in the duck embryo cell growth medium for at least 3 to 6 days, (7) separating at least a portion of the growth medium containing rabies virus from the growing cells, (8) mixing the separated rabies virus containing growth medium with a stabilizing menstruum, and (9) drying and freezing the rabies virus composition from step 8 to less than about 5 percent of moisture, as determined by the Karl Fischer method.

The fixed rabies virus, e.g., the CVS–11 strain, as received from the deposit source should be grown in a series of alternate passages through cell culture and brain tissue to increase the virus titer prior to being used for the production of the live, attenuated rabies virus vaccines of this invention. I have found according to an embodiment of this invention that an improved rabies virus seed can be prepared by growing the original fixed rabies virus alternately in (a) mouse brain, or SRB, and (b) duck embryo tissue cultures until animal seroconversion tests and $LD_{50}$ tests show that the virus has a sufficiently enhanced titer. I prefer that the virus be grown alternately in a mouse brain or SRB, and then in a duck embryo tissue culture until the virus has grown in each system at least five times, followed by continued growth of the virus in duck embryo tissue cultures for at least 6 to 12 passages before it is used as rabies seed virus in the production of the rabies virus vaccine by the method of this invention. We prefer to use as rabies virus seed that virus taken from the sixth to eighth sequential duck embryo passage after the alternate mouse brain or suckling rat brain and duck embryo growth cycles.

The original rabies virus was obtained from the United States National Institutes of Health in late 1954, labeled CVS–11 strain. It is obtainable from the Division of Biological Standards, National Institutes of Health, Bethesda, Maryland, 20014. We have prepared the seed virus by passing the original CVS–11 strain of rabies virus four times in mouse brain and then passing it one time in growing duck embryos. A 10 percent extract of rabies infected whole duck embryo in a buffered aqueous diluent was then used to inoculate 7 day old duck embryos. These duck embryos were trypsinized after 7 to 9 days of incubation. The infected cells so obtained were used in cell cultures to produce rabies virus. The rabies virus harvested from the infected cells was concentrated to one-fifth its volume by dialyses against "Carbowax 6000" (polyethyleneglycol having an average molecular weight of about 6,000). This virus concentrate was inoculated intracerabrally into 12–14 g. mice. When the infected mice were moribund the brains were harvested aseptically and emulsified, to a 10 percent suspension in sterile distilled water in a Waring Blender. This emulsified rabies virus seed was used to infect more duck eggs. After incubation of the eggs, the infected embryos were separated from their shells, the embryos were trypsinized, and the trypinized infected cells were used to produce more cell culture as described above. The duck embryo cultures were used to inoculate mice, and the emulsified infected mice brains were used to inoculate duck embryos. This procedure of alternately passing the rabies seed virus in duck embryo cell cultures and then in mouse brain were repeated five times in each system. At this time the rabies was repeated five times in each system. At this time the rabies virus titers were high enough minimal lethal dose $_{50}$ ($MLD_{50}$) ($10^{-4.0}$ to $10^{-4.5}$) to continue passing the virus seed in duck embryo cell culture only. The seed presently contemplated for vaccine production represents the sixth and seventh passage in duck embryo cell culture after the fifth alternate passage in mouse brain.

Each rabies seed virus pool and rabies virus harvest fluid is tested for potency and purity by fulfilling the requirements of standard U.S. Agricultural Research Service (ARS) tests for sterility (Standard Procedures P–15, P–57), potency (Standard Requirement V–64, III C and D), safety test, tissue culture safety tests, moisture test (not more than 5 percent by Karl Fischer Method).

Seven-day-old embryonated duck eggs are used to propagate the rabies virus prior to its being established in trypsinized duck egg cell culture monolayers. "NZ Amine–AS" (a product of Sheffield Chemical) and sucrose are used in the media as bulking agents. The trypsin solution used to trypsinize the tissues contains 0.25 percent to 1 percent trypsin in water containing 100 units of penicillin G and 100 mcg. of streptomycin per ml (the antibiotics). Hank's Balanced Salt Solution is used with or without 100 units of penicillin and 100 mcg. of streptomycin per ml. Medium 199 containing 3 percent Bovine adult or fetal calf Serum is also used as maintenance medium. During the virus growth phase 30 units of penicillin per ml. and 50 MCG of streptomycin per ml. are used.

The rabies virus cultures can be grown in various size containers. For example, seed and production containers varying from 8 oz. prescription bottles to 5 liter Pyrex Povitsky bottles for virus production can be used.

In growing the rabies virus seed, the supernatant fluids on the infected duck embryo infected tissue cultures at the appropriate passage and virulence level (as measured by virus titers $10^{-4.0}$ to $10^{-5.0}$ $LD_{50}$) are poured off and used as the seed to infect the six-to-eight-day-old fertile eggs, without any further processing except freezing at −50° C. or lower, if the fluids are not to be used promptly.

We prefer to inoculate the rabies virus seed culture as a 1:50 $^r$/v dilution in medium 199 into seven-day-old embryonated duck eggs which are then incubated. The inoculated embryos are held at 34° to 37° C. for six to 10 days. The infected, incubated embryos are then harvested, trypinized, and planted as duck embryo cell cultures. The monolayer cell cultures are held for 5 to 21 days at 30° to 34° C. to permit growth of the virus. No characteristic cytopathogenic effect from the virus is observed. If mold or bacterial contamination should occur, it will usually be visible microscopically. Virus content is determined by virus titer tests on samples of the growth medium (V–64 ARS Regulations).

Animal protection tests against virulent CVS or street virus challenge and characteristic symptoms in animals after intracranial inoculation serve as identity tests. Each virus pool is identified by a serological method in which the virus is mixed with a known specific anti-rabies virus serum allowed to incubate, and tested by intracerebral inoculations in susceptible mice.

The incubated, rabies-infected duck embryos are aseptically removed from the egg shells after candling. The embryos are debeaked and then established in tissue culture by conventional methods. The tissue culture fluids which are pure are aseptically poured off into harvest containers for pooling and sampling. All discarded material is formalized or steam sterilized before disposal. Harvested rabies virus, produced by the method of this invention, may be used immediately or be held at 0° to 5° C. for not more than 35 days before being filled, frozen, and lyophilized.

No inactivation of the virus is done. The only preservatives used in the product are penicillin and streptomycin used in the tissue culture media. The rabies vaccine product consists of a uniform mixture of tissue culture rabies virus fluids and a stabilizing and bulking menstruum. Satisfactory bulk virus fluids and the stabilizing menstruum are combined in a sterile pooling container. The stabilizing and bulking menstruum is used in quantity sufficient to preserve the virus titer and to prolong the shelf life of the rabies vaccine product. Generally, from 3 to 5 percent by volume of the stabilizing menstruum is added to the virus containing fluids. A preferred stabilizing menstruum for this purpose is the "N–Z Amine AS" product, referred to above. An example is as follows:

| | |
|---|---|
| Virus Fluids | 50,300 ml |
| N–Z Amine AS/sucrose 20 percent solution | 9,144 ml |
| Total: Final Bulk Vaccine Vo. | 59,444 ml |

The average batch size of the vaccine product generally runs about 60,000 ml. although batches of about 145,000 ml can be made.

Vials of filled vaccine into which fluted lyophilizing stoppers are partially inserted are frozen at −50° C. or lower. Shelf temperature and chamber pressure are accurately controlled and recorded during the drying cycle. The desiccating cycle is usually 24 to 96 hours. The finished vaccine should be dried to a residual moisture content of less than 5 percent by the Karl Fisher method. Samples of the vaccine are taken for sterility, potency, and safety tests as indicated above. The final containers are filled by forcing the product from the serial containers into the final containers under filtered air or equivalent pressure. The operation is carried out in a closed room under aseptic conditions. The contents of the large serial containers are maintained as a uniform mixture by agitation during the bottling operation. After completion of the drying cycle the vials are stoppered under vacuum, and sealed with aluminum seals.

The vaccine product is prepared in desiccated form and will be marketed in resistant glass or equivalent bottles. Single-dose and 10-dose vials are produced and each vaccine vial is accompanied by a vial of sterile deionized water diluent to restore the dry vaccine. The return date is 1 year from the date of completion of a satisfactory potency list or retest, but not to exceed 18 months from the date of virus harvest.

The rabies virus vaccine product of this invention is useful for and recommended for use in the immunization of healthy dogs and cats against rabies. The dosage is about 1 to 2 ml of the reconstituted vaccine (1 to 1 $^r$/v dilution with water) injected intramuscularly. Dogs and cats vaccinated before the age of 6 months should be re-vaccinated at 6 months of age. Yearly re-vaccination is recommended. It can also be used for the immunization of cattle against rabies virus infection in doses of about 10 to 20 ml of the rabies virus vaccine product. Good serum neutralization (SN) titers have been obtained in young calves. The vaccine proved to be safe in these calves.

This live, attenuated rabies virus vaccine can be concentrated, before or after admixture with the stabilizing menstruum, to a product containing greater than 100 times its rabies virus content by zonal centrifugation methods now known.

Potency testing of the vaccines of this invention indicate that they have good antigenicity. They can be purified by zonal centrifugation methods to a very low protein nitrogen content, e.g., to about 0.02 mg./ml. This vaccine is also contemplated for use in humans after inactivation of the virus by conventional methods. These vaccines can be used as good pre- or post-rabies exposure products with little local or systemic reactivity, high antigenic concentration, and prompt antibody response.

A detailed method for producing the live, attenuated rabies virus vaccine of this invention is set forth below.

EXAMPLE 1

GROWTH OF LIVE ATTENUATED RABIES VIRUS VACCINE

Egg Inoculation

Bottles of frozen rabies duck embryo adapted cell culture seed fixed CVS–11 strain, are thawed in ice water while shielding the virus from light. The thawed seed virus is diluted 1:10 to 1:500 with cold MEDIUM 199 containing penicillin and streptomycin antibiotics. Fertile duck eggs which have been incubated for 7 days are candled before inoculation. Those eggs with dead or underdeveloped embryos are discarded. The air sac surfaces of the selected eggs are cleaned with an iodine tincture and then with isopropyl alcohol and a small hole is drilled in the air sac end of the egg. Each egg is then inoculated with 0.2 ml. of the above seed virus dilution into the yolk sac using sterile 1½ inch 22 gauge needles. The holes are sealed with collodion. The eggs are incubated at 35°–36° C. for 7–9 days. The eggs are candled. Those with dead embryos are discarded.

HARVEST OF EMBRYOS

The surfaces of the infected duck eggs are cleaned with an iodine tincture, followed by 95 percent isopropyl alcohol. Under aseptic conditions, the shells are removed from the eggs, the embryos are removed from the eggs, and transferred to petri dishes (4–6 embryos/dish).

The embryos are rinsed three times with Hank's Balanced Salt Solution with penicillin and streptomycin antibiotic additives. The front of the head of each embro is removed with sterile scissors to exclude eyes and beaks from the product. Ten embryos are transferred to a 50 ml. centrifuge tube and minced with shears until tissue fragments are about 1 mm. in size. To each tube of minced embryos, 10 ml. of Hank's Balanced Salt solution without antibiotics are added and poured off three or four times. The supernatant is poured off. After removing samples of the minced embryo tissue from each flask for Salmonella detection tests, 0.25 to 1 percent trypsin solution with antibiotics is added to each flask. The minced tissue-trypsin suspension is stirred for 45–60 minutes at 35°–36° C. The resulting duck embryo tissue cell suspension is filtered from each flask through triple gauze into 250 ml. centrifuge bottles. The cell containing bottles are centrifuged at 1,000 rpm for 10 minutes at 5° C. The supernant is discarded and the cells are resuspended with MEDIUM 199 with antibiotics containing 3 percent bovine serum. The cell suspension is centrifuged at 1,000 rpm for 10 minutes at 5° C. The supernant is discarded. The cells are transferred to a graduated centrifuge tube and suspended in 40 ml. of MEDIUM 199 with antibiotics containing 3 percent bovine serum. The cells are centrifuged again at 1,000 rpm for 10 minutes at 5° C.

CELL PLANTING

Each 1 ml. of packed duck embryo tissue cells, prepared as above, is diluted with 999 ml. of MEDIUM 199 with antibiotics containing 3 percent bovine serium. The suspended cells are stirred for 10 minutes and then planted 100 ml. to each cell culture bottle. After stoppering, the culture bottles are incubated at 31°–32° C. for 120 hours (5 days).

FIRST HARVEST

After five days, the contents of the bottles are inspected for contamination, discarding any unacceptable bottles, and then 5 percent portions of the contents of the remaining bottles are microscopically examined for cytopathogenic effect and cell growth. The fluids from the culture bottles are aseptically harvested and pooled. Samples of the pooled fluids are taken for sterility, $LD_{50}$, and pleuropneumonialike organisms (PPLO) tests and stored at –60° C.

The culture tubes are re-fed with 100 ml. portions of MEDIUM 199 with antibiotics containing 3 percent bovine serum. The cultures are incubated again at 31°–32° C. for 96 hours (4 days).

SECOND HARVEST

Five percent of the culture bottles are microscopically observed for cytopathogenic effect and cell growth. Any contaminated bottles are discarded. The culture bottle fluids are aseptically harvested and pooled into a sterile container. Samples are taken for $LD_{50}$ and PPLO tests and stored at –60° C. The cultures remaining are discarded and decontaminated.

Samples of the pooled rabies virus containing fluids from each harvest are taken for duck embryo Tissue Culture Safety Test (TCST), dog kidney TCST, duck embryonated egg safety tests. To the remaining pooled virus fluid 20 percent N–Z AMINE-AS bulking agent, is added to give a final concentration of approximately 3 percent in the final virus vaccine, using the following formula:

$$\frac{\text{Volume virus (ml.)} \times 3}{17} = \text{Volume ``NZ Amine-AS'' 20 percent to be added to vaccine.}$$

The treated virus fluid is mixed thoroughly and then samples are extracted for final bulk sterility tests and stored at 2° to 8° C., preferably 5° C. The vaccine composition is stored at 5° C. until it is filled into suitable dispensing containers such as ampoules.

The table given below lists the rabies virus titers in 12 consistency lots of cell culture rabies vaccine prepared by the method described above.

| Lot.No. | Virus Titer *Mouse $LD_{50}$ Log $10^{-x}$/0.03 ml. where $x$ is |
|---|---|
| 1 | 4.3 |
| 2 | 4.4 |
| 3 | 4.2 |
| 4 | 3.8 |
| 5 | 4.4 |
| 6 | 4.3 |
| 7 | 4.5 |
| 8 | 4.5 |
| 9 | 3.7 |
| 10 | 4.4 |
| 11 | 3.7 |
| 12 | 4.4 |

Footnotes: Virus titers are reciprocals of Log $LD_{50}$
*Titers in 12–14 gram. mice These results indicate a satisfactory consistency of producing a rabies vaccine in duck embryo culture with adequate mouse $LD_{50}$ Liters.

Diluting and bulking agents for use in the process of this invention are those normally used in preparing vaccine products. These products usually contain sugars and amino acids. Lactose, lactose-gelatin, and casein digest preparations are also commonly used for this purpose. We prefer to use an aqueous solution of a commercially available pancreatic digest of casein sold under the trade name "NZ–AMINE–AS" by Sheffield Chemical of Norwich, N.Y. When used as a bulking agent for vaccine compositions, as when preparing the live rabies virus product of this invention, the NZ–AMINE–AS powdered product can be formulated in proportions similar to the example set forth below:

Add 2,000 grams of NZ–AMINE–AS and 2,000 grams of analytical reagent grade sucrose to 6,000 milliliters of hot pyrogen free water. Mix until both reagents are in solution. Adjust the pH to 7.3 to 7.4 with 10 N potassium hydroxide. Autoclave for 30 minutes at 121° C. If necessary readjust the pH to 7.3 to 7.4 with sterile 10 N potassium hydroxide. Store at 4° C.

A typical Analysis of NZ-AMINE-AS is as follows:

| | Percent |
|---|---|
| Moisture | 3.52 |
| Ash | 5.05 |
| Total Nitrogen | 12.58 |
| Amino Nitrogen | 6.83 |
| Amino N/Total N | 54.3 |
| Sodium | 2.25 |
| Chloride | 0.28 |
| Total Phosphate | 2.25 |
| Calcium | 0.28 |
| pH (2 percent solution) | 6.55 |
| Solubility (clear, 30° C.) | 210 grams/1000 cc. |

Amino Acid Assay:

| | |
|---|---|
| Valine | 6.0 |
| Leucine | 7.2 |
| Isoleucine | 6.2 |
| Serine | 1.4 |
| Lysine | 9.4 |
| tryptophane | 1.2 |
| Phenylalanine | 3.5 |
| Tyrosine | 1.4 |
| Methionine | 2.3 |

Lactose and lactose-gelatin bulking agents can also be used in lyophilized rabies vaccine products. Lactose is used as a diluent-bulking agent in the preparation of the 10 percent duck embryo extract of rabies virus seed material for initiation of the alternate passage procedure. For example, the diluent can be prepared as follows:

Sterilize 6 liters of distilled, pyrogen-free, water by autoclaving. Chill the water to 4° C. and then add 300 grams of lactose (milk sugar), 15 grams of dibasic potassium phosphate, 300 milligrams of neomycin sulfate, and mix well to dissolve. Then adjust the pH of the solution to 7.6–7.8 with 1 N potassium hydroxide. Filter the mixture through a Seitz sterilizing filter into chilled sterile bottles. Store at 4° C.

An example of a lactose-gelatin bulking agent which can be used can be prepared as follows:

To 250 grams of lactose add enough pyrogen free water to make 1 liter. Sterile filter through a Seitz or a millipore filter (25 percent solution). To 100 grams of gelatin add enough pyrogen free water to make 1 liter. Autoclave for 20 minutes at 121° C (10 percent solution). To the vaccine to be lyophilized add the lactose solution to a final concentration of 5 percent by volume, and add enough of the gelatin solution to make a final concentration if 0.25 percent by volume. If necessary, adjust the resulting vaccine product to a final pH of about 7.3 to 7.4.

EXAMPLE 2

RABIES DUCK EMBRYO TISSUE CULTURE VACCINE

Purpose:
 To test two different lots of rabies duck embryo tissue culture vaccine in guinea pigs and dogs.
Materials:
 1. Rabies duck embryo tissue culture vaccine lots A (titer = $10^{3.84}$ MLD$_{50}$/0.013 ml. after freeze drying) and B (titer = $10^{.263}$ MLD$_{50}$/0.03 ml. after freeze drying).
 2. 51 guinea pigs, 400 grams or larger.
 3. 50 random dogs (majority four months old).
 4. CVS strain of fixed rabies virus for SN tests.
 5. NYC–Ga strain of street rabies virus for dog challenge.
 6. CVS–24–GP–18 strain of fixed rabies virus for guinea pig challenge.
Procedure:
 1. Test the vaccine lots in guinea pigs.
  a. Divide guinea pigs into four different groups.
   1. Vaccinate 13 guinea pigs IM with 0.25 ml. of undilute vaccine, Lot A.
   2. Vaccinate 13 guinea pigs IM with 0.25 ml. of 1/10 dilution of vaccine, Lot A.
   3. Vaccinate 13 guinea pigs IM with 0.25 ml. of 1/10 dilution of vaccine, Lot B.
   4. Leave 12 guinea pigs as unvaccinated controls.
Footnotes:
 NYC–Ga strain — RIG 27–3 No. 195–CDC–Atlanta, Georgia isolated from salivary glands of a rabies (street virus) infected dog, obtainable from CDC in Atlanta, Georgia.
  b. Twenty-one days following vaccination challenge IM all of the guinea pigs with 0.5 ml. of the CVS–24–GP–18 strain of fixed rabies virus.
  c. Observe for 21 days and record results.
 2. Test the vaccine lots in dogs.
  a. Vaccinate all the dogs for hepatitis, distemper, and leptospirosis.
Take a blood sample from all of the dogs.
  c. Divide the dogs into five equal groups.
   1. Vaccinate 10 dogs with 1.0 ml. IM of the undiluted vaccine, Lot A.
   2. Vaccinate 10 dogs with 1.0 ml. IM of the 1/10 diluted vaccine, Lot A.
   3. Vaccinate 10 dogs with 1.0 ml. IM of the undiluted vaccine, Lot B.
   4. Vaccinate 10 dogs with 1.0 ml. IM of the undiluted vaccine, Lot B.
   5. Leave 10 dogs as unvaccinated controls.
  d. Rebleed the dogs approximately 28 days after vaccination.
  e. Challenge all of the dogs with the NYC–Ga strain of street rabies virus injection in the masseter muscle.
  f. Observe for 40 days and record results.
Results:

1. Guinea pig protection test.

CHALLENGE RESULTS

| Vaccine Lot | No. of Survivors/ No. in Group | Percent Survived |
| --- | --- | --- |
| 1. Lot A | | |
| undiluted | 12/12* | 100 |
| 1/10th dilution | 10/13 | 77 |
| 2. Lot B | | |
| 1/10th dilution | 7/13 | 54 |
| 3. Controls | 2/11* | 18 |

*One guinea pig died before challenge

The results indicate that Lot B did not immunize the guinea pigs adequately with 1/40 the dog dose which may partially be explained in that the mouse LD$_{50}$ titer of this lot after freeze drying did not meet standard requirements. On the other hand, Lot A did protect and did meet the standard requirements. These observations suggest that all lots of vaccine must meet the minimum standard titer requirements as set forth by the ARS.

2. Dog Protection Test
RDETC—LOTS A and B

| Dog Number and Group | SN Results Pre-vaccination | Post-vaccination | Challenge Results |
| --- | --- | --- | --- |
| Lot A | | | |
| 1. 1.0 ml. undilute IM | | | |
| 0178 | <1 | <1 | D* |
| 0290 | <1 | 23 | S |
| 0293 | <1 | >32 | S |
| 0297 | <1 | 3.3 | S |
| 0300 | <1 | <1 | S |
| 0301 | <1 | <1 | S |
| 0328 | <1 | 26 | S |
| 0362 | <1 | >64 | S |
| 0365 | <1 | 20 | S |
| 0385 | <1 | 3.7 | S |
| 2. 1.0 ml. of 1/10th dilution Im | | | |
| 0174 | <1 | 17 | S |
| 0291 | <1 | >64 | S |
| 0294 | <1 | 8.6 | S |
| 0296 | <1 | <1 | D |
| 0298 | <1 | <1 | D |
| 0357 | <1 | <1 | D |
| 0372 | –1 | >64 | S |
| 0378 | <1 | >64 | S |
| 0380 | <1 | 9.8 | S |
| 0686 | <1 | >64 | S |
| Lot B | | | |
| 1. 1.0 ml. undiluted IM | | | |
| 0175 | <1 | 60 | S |
| 0288 | <1 | >32 | S |
| 0302 | <1 | 45 | S |
| 0326 | <1 | 60 | S |
| 0360 | <1 | 2.8 | S |
| 0368 | <1 | 7.5 | S |
| 0373 | <1 | >64 | S |
| 0374 | <1 | >64 | S |
| 0379 | <1 | 60 | S |
| 0685 | <1 | >64 | S |

Footnote: RDETC = Rabies Duck Embryo Tissue Culture

| Dog Number and Group | SN Results Pre-vaccination | Post-vaccination | Challenge Results |
| --- | --- | --- | --- |
| 2. 1.0 ml. of 1/10th dilution IM | | | |
| 0179 | 1 | 20 | S |
| 0287 | 1 | 26 | S |
| 0292 | 1 | 64 | S |
| 0304 | 1 | 1 | D |
| 0329 | 1 | 2.5 | S |
| 0333 | 1 | 1 | D |
| 0361 | 1 | 1 | D |
| 0366 | 1 | 52 | S |
| 0371 | 1 | 64 | S |
| 0383 | 1 | 1 | D |
| Unvaccinated Controls | | | |
| 0177 | 1 | 1 | D |
| 0286 | 1 | 1 | D |
| 0289 | 1 | 1 | S |
| 0305 | 1 | 1 | D |
| 0330 | 1 | 1 | D |
| 0332 | 1 | 1 | D |
| 0358 | 1 | 1 | D |
| 0363 | 1 | 1 | D |

| | | | |
|---|---|---|---|
| 0367 | 1 | 1 | D |
| 0381 | 1 | 1 | D |

*D = Died; S = Survived

The results indicate that all dogs with a detectable SN antibody titer will be protected against an intramuscular street rabies virus challenge. In addition, some dogs without measurable SN antibody will survive challenge also. The age of these dogs was mostly between 4 to 4½ months at the time of vaccination which may account for some lower SN antibody levels. However, an adequate level of protection was observed in the vaccinated animals when compared to the unvaccinated controls. Even the low titered vaccine, Lot B, which had approximately 0.7 $\log_{10}$ less of virus than the requirement protected all of the dogs with the full field dose and 60 percent at 1/10 of the field dose. These results indicate that vaccine lots passing the titer requirement will have ample virus to immunize dogs solidly with the full field dose.

Conclusion:

Both vaccine lots were safe and protected dogs against an intramuscular street rabies challenge. A field dose of even the low-titered vaccine, Lot B, protected dogs solidly. The results suggest that a 4-month-old dog is approaching the minimal age of vaccination for satisfactory vaccine conversion as determined by the SN test.

I claim:

1. A process for preparing a live, attenuated rabies virus vaccine which comprises (1) infecting fertile duck eggs with a modified fixed rabies virus which had been grown alternately in a mouse brain and then in a duck embryo tissue culture until the virus has grown in each system at least five times followed by continued growth of the virus in duck embryo tissue cultures for at least six to 12 passages, (2) incubating the duck embryos for six to 10 days, (3) separating the rabies-infected duck embryos from their shells, (4) trypsinizing the rabies-infected duck embryo cell tissues, (5) seeding a duck embryo tissue cell growth medium with the trypsinized, rabies infected cells from step (4), (6) growing the rabies infected cells in the cell growth medium for from about 3 to about 8 days, (7) separating at least a portion of the rabies virus-containing growth medium from the growing rabies-infected duck embryo cells, (8) mixing the separated rabies virus-containing growth medium with from 3 to about 5 percent stabilizing bulking agent and (9) freezing and drying the rabies virus composition from step 8 to less than about 5 percent by weight of moisture as measured by the Karl Fischer method.

2. A process as defined in claim 1, wherein in step (1) the fixed rabies virus is grown alternately in (a) mouse brain and (b) duck embryo tissue cultures until the virus titer had reached a minimum of $10^{-4.0}$ MLD$_{50}$/0.03 ml. of virus fluid, and then the rabies virus is grown in duck embryo tissue cultures for from six to 13 passages, before it is used as rabies virus seed in the production of the rabies virus vaccine.

3. A process as defined in claim 2 wherein the rabies seed virus is grown alternately in mouse brain and duck embryo tissue cultures until the virus has grown in each system at least five times, followed by continued growth of the rabies virus in duck embryo tissue cultures for from six to seven duck embryo tissue culture growth cycles, before it is used in the production lots of rabies virus vaccine.

4. A process for preparing a live attenuated rabies virus vaccine which comprises (1) infecting fertile duck eggs with a modified fixed rabies virus which has been grown alternately in a suckling rat brain and then in a duck embryo tissue culture until the virus has grown in each system at least five times followed by continued growth of the virus in duck embryo tissue cultures for at least 6 to 12 passages, (2) incubating the duck embryos for 6 to 10 days, (3) separating the rabies-infected duck embryos from their shells, (4) trypsinizing the rabies-infected duck embryo cell tissues, (5) seeding a duck embryo tissue cell growth medium with a trypsinized, rabies infected cells from step (4), (6) growing the rabies infected cells in the cell growth medium for from about 3 to about 8 days, (7) separating at least a portion of the rabies virus-containing growth medium from the growing rabies-infected duck embryo cells, (8) mixing the separated rabies virus-containing growth medium with from 3 to about 5 percent stabilizing bulk agent and (9) freezing and drying the rabies virus composition from step 8 to less than about 5 percent by weight of moisture as measured by the Karl Fischer method.

5. A process as defined in claim 4 wherein in step (1) the fixed rabies virus is grown alternately in (a) suckling rat brain and (b) duck embryo tissue cultures until the virus titer has reached a minimum of $10^{-4.0}$ MLD$_{50}$/0.03 ml. of virus fluid, and then the rabies virus is grown in duck embryo tissue cultures for from 6 to 13 passages, before it is used as rabies virus seed in the production of rabies virus vaccine.

* * * * *